(12) United States Patent
Ryan

(10) Patent No.: US 12,715,539 B2
(45) Date of Patent: Aug. 25, 2026

(54) REAR SUSPENSION FOR TWO-WHEELED VEHICLE

(71) Applicant: LTP Sports Group Inc., Port Coquitlam (CA)

(72) Inventor: Colin Ryan, Maple Ridge (CA)

(73) Assignee: LTP Sports Group Inc., Port Coquitlam (CA)

( * ) Notice: Subject to any disclaimer, the term of this patent is extended or adjusted under 35 U.S.C. 154(b) by 494 days.

(21) Appl. No.: 18/340,237

(22) Filed: Jun. 23, 2023

(65) Prior Publication Data

US 2024/0017790 A1 Jan. 18, 2024

Related U.S. Application Data

(60) Provisional application No. 63/390,163, filed on Jul. 18, 2022.

(51) Int. Cl.
*B62K 25/30* (2006.01)
*B62K 3/02* (2006.01)
*B62K 25/04* (2006.01)
*B62K 25/28* (2006.01)

(52) U.S. Cl.
CPC .................................. *B62K 25/286* (2013.01)

(58) Field of Classification Search
CPC ....... B62K 25/286; B62K 25/30; B62K 25/28
USPC .......................................................... 280/284
See application file for complete search history.

(56) References Cited

U.S. PATENT DOCUMENTS

| | | | | |
|---|---|---|---|---|
| 10,850,798 | B2 | 12/2020 | Chamberlain et al. | |
| 2010/0059965 | A1* | 3/2010 | Earle .................... | B62K 25/286 280/284 |
| 2014/0217697 | A1* | 8/2014 | Buckley ............... | B62K 25/286 280/284 |
| 2015/0001829 | A1* | 1/2015 | Berthold .............. | B62K 25/286 280/284 |
| 2019/0300096 | A1* | 10/2019 | Chamberlain ........... | B62K 3/02 |

* cited by examiner

*Primary Examiner* — Vivek D Koppikar
*Assistant Examiner* — Nabin Kumar Sharma
(74) *Attorney, Agent, or Firm* — Klarquist Sparkman, LLP

(57) ABSTRACT

A bicycle rear suspension based on a four bar configuration comprises an upper connecting member, a rear axle floating member, a lower connecting member, an upper shock actuation member, a pushrod member, and a damper member. A pivotable coupling couples a first location on the upper shock actuation member to a location on the front triangle, another pivotable coupling couples a second location on the upper shock actuation member to a first location on the pushrod member, and another pivotable coupling couples a second location on the pushrod member to a location on the lower connecting link member. The upper shock actuation member is pivotably coupled to the damper member. The upper shock actuation member and the pushrod member and the geometries of their respective pivotable couplings allow the leverage curve for the suspension to be defined independently of their kinematic traits, thereby providing improved rider feel and/or performance.

5 Claims, 10 Drawing Sheets

48
24
12
20
38
14
42
22
36
44
26, 40
34
16

48
32
12
24
20
42
46
36
44
34
26, 40
14
22
18
16

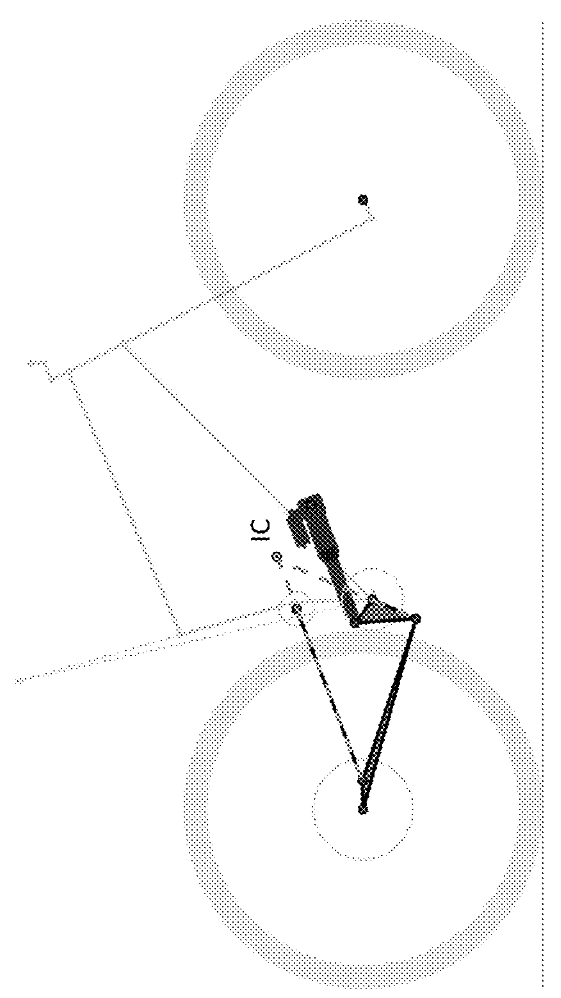
FIG.6(a) [PRIOR ART]
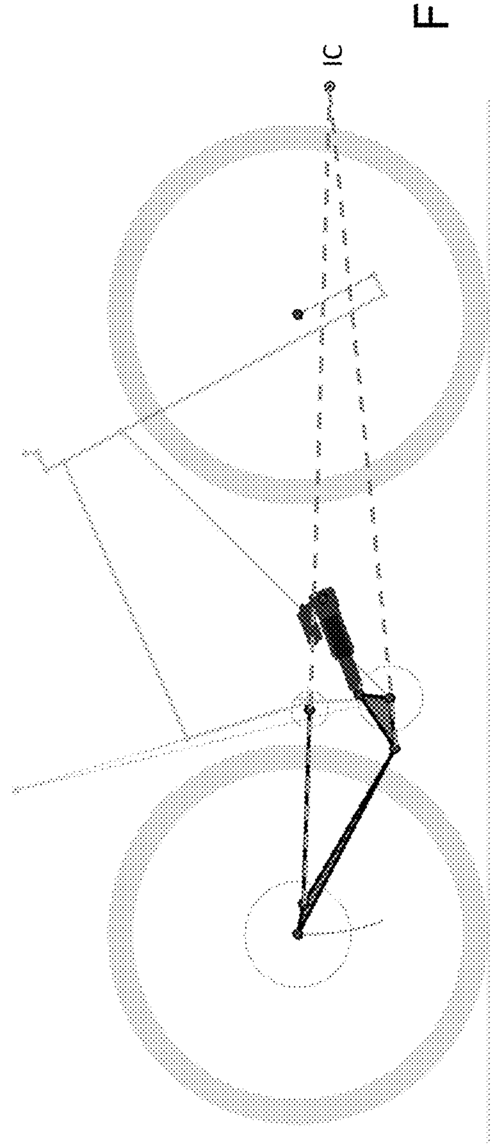
FIG.6(b) [PRIOR ART]

REAR SUSPENSION FOR TWO-WHEELED VEHICLE

CROSS-REFERENCE TO RELATED APPLICATIONS

This application claims the benefit of U.S. Provisional Patent Application No. 63/390,163, filed Jul. 18, 2022, which is incorporated by reference herein in its entirety.

FIELD

This disclosure relates generally to a rear suspension for a two-wheeled vehicle such as a bicycle, electric assisted bicycle, or motorcycle.

BACKGROUND

Two-wheeled vehicle suspension technology has made significant advances in the past several decades, especially rear suspension designs for mountain bikes. Modern rear suspension designs are designed to control different aspects of suspension kinematic performance, including axle path, anti-rise, anti-squat, and leverage rate. An important design goal is to tune the ride feel of the suspension to provide a desirable combination of predictability, sensitivity, and control.

There are many different classifications of rear suspension linkages for two wheeled vehicles. One of the most common classes of rear suspension linkage is a four-bar linkage. In general, a four-bar linkage consists of a floating link that contains the rear axle ("rear axle floating link") and is pivotally connected to both an upper and lower connecting link. The upper and lower connecting links are pivotally connected to the main frame/chassis (also referred to as "front triangle") of the vehicle. In this design the rear axle floating link "floats" relative to the front triangle, meaning its path through the suspension travel is defined by a virtual instant centre that is defined by the pivotable connections of the upper and lower connecting links. This design gives designers greater freedom to control kinematic parameters such as axle path, anti-rise, anti-squat and leverage ratio.

The most common subset of a four-bar linkage is a Horst link. A Horst link suspension is characterized by a floating link pivotally connected at each end to a pair of connecting links (upper and lower connecting links), wherein the distance between the pivotable couplings on the lower connecting link is longer than the distance between the pivotable couplings on the upper connecting link. The upper and lower connecting links are each pivotally connected to the seat tube of the front triangle, and the rear axle is typically located higher than the pivot connecting the floating link to the lower connecting link. Due to the lower connecting link being significantly longer than the upper connecting link, the instant centre typically moves rearward as the suspension is compressed and this defines characteristic anti-rise, anti-squat and axle path traits.

Another subset of the four-bar linkage that differs from the more common Horst link design employs an upper connecting link that has a distance between its pivotable couplings that is significantly longer than the distance between the pivotable couplings on the lower connecting link. In this implementation, the instant centre moves forward as the suspension is compressed. The forward motion of the instant centre through the suspension travel allows a designer to define unique anti-rise and axle path characteristics that are not typically achievable with the more common Horst link design.

One particularly important aspect of suspension kinematics in terms of ride feel is the leverage ratio, i.e., the magnitude of the reaction force at the shock for a unit of vertical force applied at the rear wheel. A higher leverage ratio tends to provide more sensitivity while a lower leverage ratio can aid in preventing "bottom out" of the suspension. An important aspect of suspension feel is how the leverage ratio changes through the wheel travel, which is known as the leverage curve. It is common for suspension designs to define a higher leverage ratio at the start of suspension travel and decrease the leverage ratio as the suspension is compressed. This helps to achieve a suspension that is both sensitive to inputs from the trail or road surface while also controlling high energy compression events. A challenge for suspension designers is to tune one kinematic trait such as leverage curve characteristics without materially altering other kinematic traits.

BRIEF DESCRIPTION OF FIGURES

FIGS. 6(*a*) and 6(*b*) are schematic kinematic views showing the instant center of a prior art four bar link rear suspension in uncompressed (FIG. 6(*a*)) and compressed (FIG. 6(*b*)) positions.

SUMMARY

Figure 1:
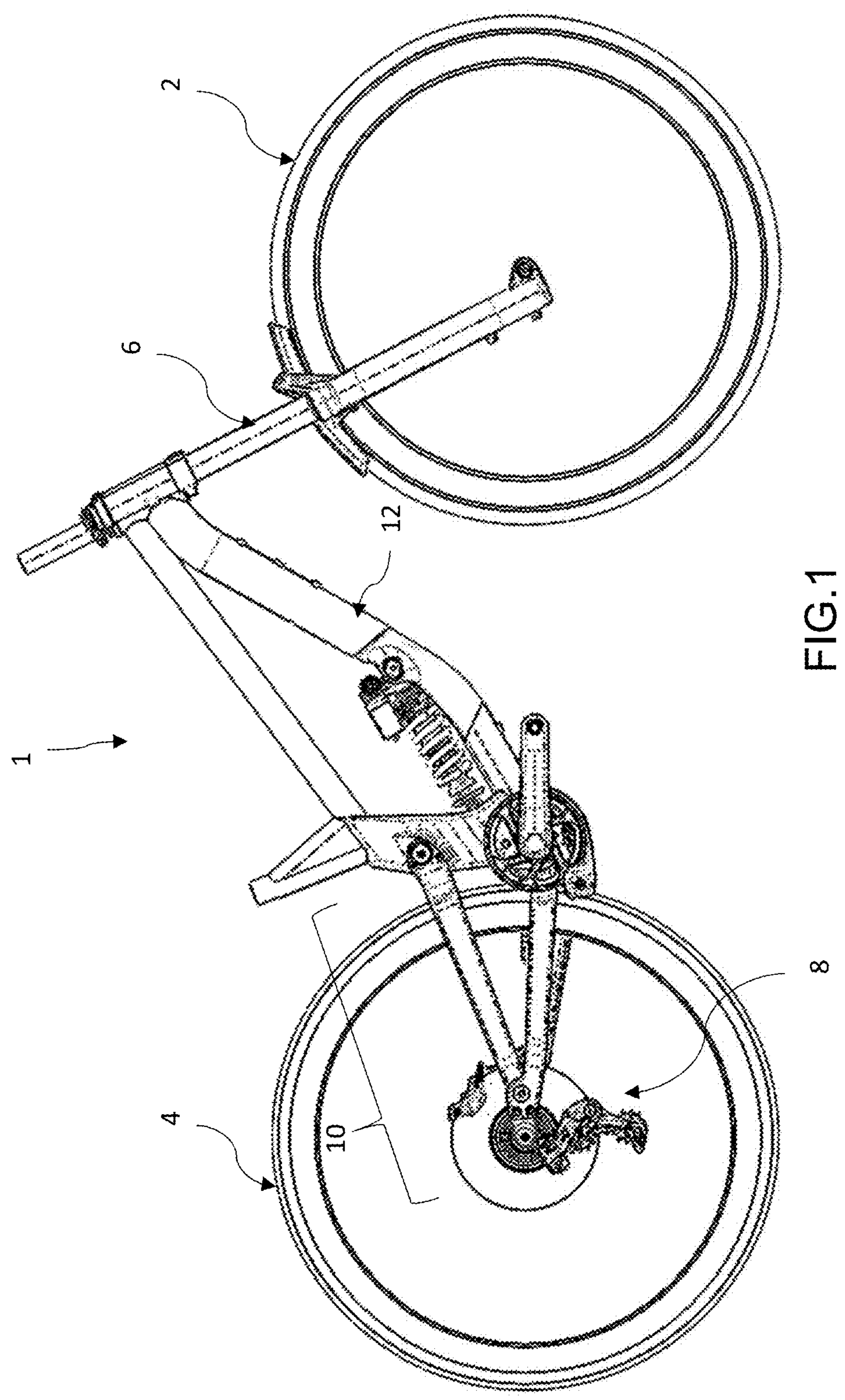
FIG. 1 is a schematic side view of a mountain bicycle comprising a rear suspension according to one embodiment.

According to one aspect of the invention, a rear suspension for a two-wheeled vehicle comprises: an upper connecting member having a first pivotable coupling for pivotably coupling a first location on the upper connecting member to a first location on a main frame of the two-wheeled vehicle; a rear axle floating member having a rear axle and a second pivotable coupling pivotably coupling a second location on the upper connecting member to a first location on the rear axle floating member; a lower connecting member having a third pivotable coupling pivotably coupling a second location on the rear axle floating member to a first location on the lower connecting member, and a fourth pivotable coupling for pivotably coupling a second location on the lower connecting member to a second location on the main frame; an upper shock actuation member having a fifth pivotable coupling for pivotably coupling a first location on the upper shock actuation member to a third location of the two-wheeled vehicle main frame; a pushrod member having a sixth pivotable coupling pivotably coupling a second location on the upper shock actuation member to a first location on the pushrod member, and a seventh pivotable coupling pivotably coupling a second location on the pushrod member to a third location on the lower connecting link member; and a damper member having an eighth pivotable coupling pivotably coupling a third location of the upper shock actuation member to a first location of the damper member, and a ninth pivotable coupling for pivotably coupling a second location on the damper member to a fourth location on the main frame. A distance between the first and second pivotable couplings along the upper connecting member is longer than the distance between the third and fourth pivotable couplings along the lower connecting member such that the instant centre of rotation of the rear axle floating member, relative to the main frame, moves forward through a motion of the rear suspension.

In some aspects of the invention, the first pivotable coupling and the fifth pivotable coupling are concentric. In other aspects of the invention, the first pivotable coupling and the fifth pivotable coupling are non-concentric, and the sixth pivotable coupling is located between the fifth pivotable coupling and the eighth pivotable coupling. In yet other aspects of the invention, the first pivotable coupling and the fifth pivotable coupling are non-concentric, and the fifth pivotable coupling is located between the sixth pivotable coupling and the eighth pivotable coupling.

DETAILED DESCRIPTION OF EMBODIMENTS

Embodiments disclosed herein relate generally to a rear suspension for a two-wheeled vehicle such as a bicycle, electrically-assisted bicycle, or motorcycle based on a four-bar configuration where the instant centre of rotation of the rear wheel carrier member relative to the mainframe moves forward through the suspension travel, and a two-wheeled vehicle having such a rear suspension. The rear suspension comprises an upper connecting member, a floating member containing a rear axle ("rear axle floating member"), a lower connecting member, an upper shock actuation member, a pushrod member, and a damper member. A first pivotable coupling pivotably couples a first location on the upper connecting member to a first location on a front triangle of the two wheeled vehicle. A second pivotable coupling pivotably couples a second location on the upper connecting member to a first location on the rear axle floating member. A third pivotable coupling pivotably couples a second location on the rear axle floating member to a first location on the lower connecting member. A fourth pivotable coupling pivotably couples a second location on the lower connecting member to a second location on the front triangle, below the first location on the front triangle. A fifth pivotable coupling pivotably couples a first location on the upper shock actuation member to a third location on the front triangle, which in some embodiments is concentric with the first location on the front triangle. A sixth pivotable coupling pivotably couples a second location on the upper shock actuation member to a first location on the pushrod member. A seventh pivotable coupling pivotably couples a second location on the pushrod member to a third location on the lower connecting link member. An eighth pivotable coupling pivotably couples a third location on the upper shock actuation member to a first location on the damper member. In some embodiments the damper member may be attached to a damper extension member which is then pivotably coupled to the third location on the upper shock actuation member. A ninth pivotable coupling pivotably couples a second location on the damper member to a fourth location on the front triangle. The distance between the first and second pivotable couplings on the upper connecting member is longer than the distance between the third and fourth pivotable couplings on the lower connecting member. The upper shock actuation member and the pushrod member and the geometries of their respective pivotable couplings serve to define additional variables in addition to the location of the instant centre that enable a wider range of leverage curve characteristics.

Figure 2:
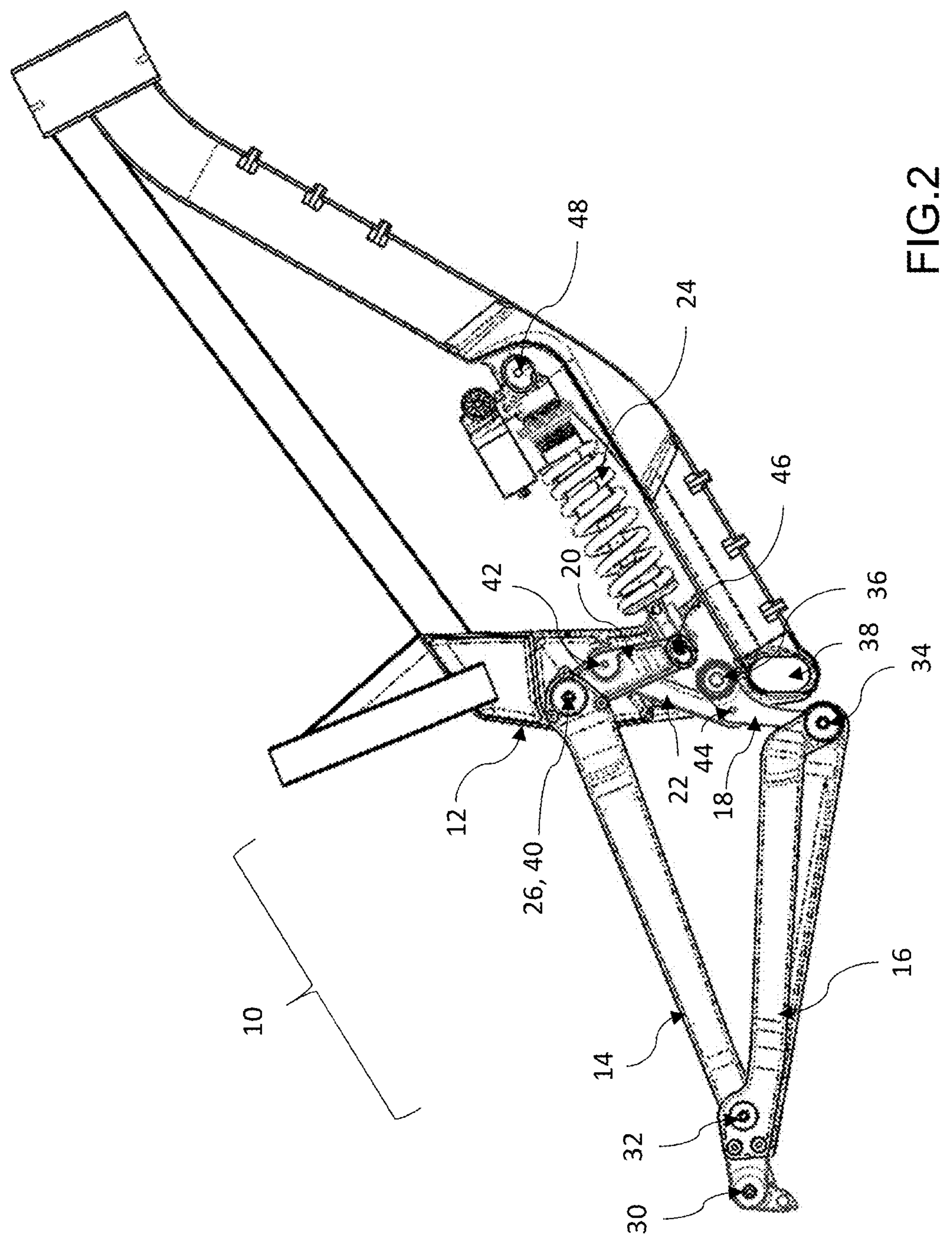
FIG. 2 is a side view of the rear suspension embodiment and sectioned side view of a frame of the bicycle shown in FIG. 1.
Figures 3, 4:
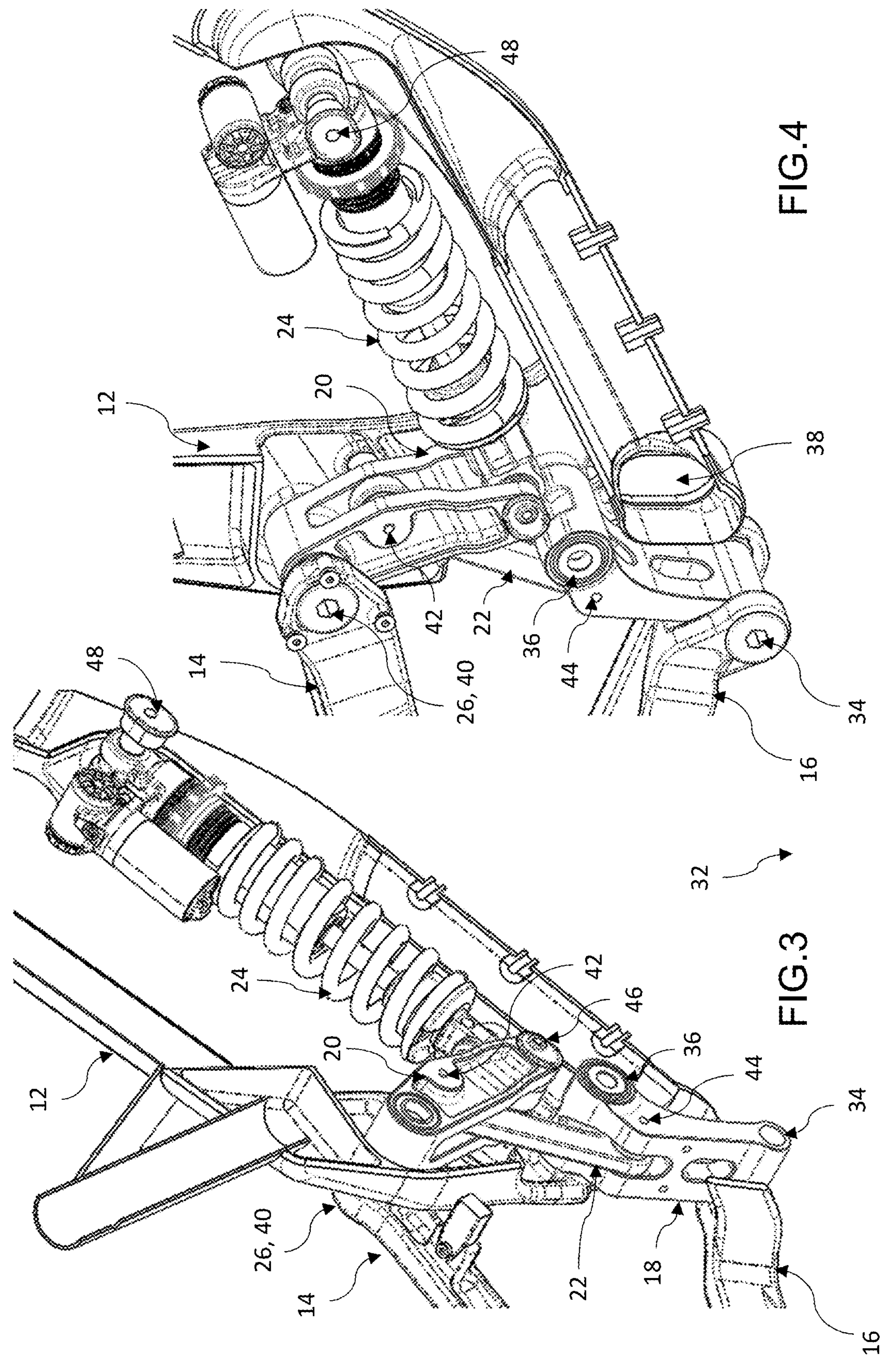
FIG. 3 is a rear isometric view of a portion of the rear suspension embodiment as shown in FIG. 2.
FIG. 4 is a front isometric view of a portion of the rear suspension embodiment as shown in FIG. 2.

A first embodiment is shown in FIGS. 1 to 8. Referring to FIG. 1, a mountain bicycle 1 comprises front and rear wheels 2, 4, front fork and front suspension 6, drivetrain components (e.g., crank, derailleurs, gears, brakes) 8, a rear suspension 10, a main frame (front triangle) 12, and other components not illustrated including a seat post, seat, and handlebars. Referring to FIGS. 2-4, the rear suspension 10 comprises an upper connecting member 14, a rear axle floating member 16, a lower connecting member 18, an upper shock actuation member 20, a pushrod member 22, and a damper member (otherwise referred to as a shock assembly) 24. These members can be composed of a metal alloy such as aluminum, steel or titanium or a composite material such as a carbon fibre composite.

A first pivotable coupling 26 pivotably couples a first end of the upper connecting member 14 to a first location on the main frame 12. A rear axle 30 extends through the first end of the rear axle floating member 16. A second pivotable coupling 32 pivotably couples a second end of the upper connecting member 14 to a location on the rear axle floating member 16 that is forward of the rear axle 30. A third pivotable coupling 34 pivotably couples a second end on the rear axle floating member 16 to a first end of the lower connecting member 18. A fourth pivotable coupling 36 pivotably couples a second end of the lower connecting member 18 to a second location on the main frame 12, below the first pivotable coupling 26 and above a bottom bracket 38.

A fifth pivotable coupling 40 is concentric with the first pivotable coupling 26 and pivotably couples a first end of the upper shock actuation member 20 to the first location on the main frame 14. A sixth pivotable coupling 42 is located on a portion of the upper shock actuation member 20 in between the pivotable couplings 40, 46 and pivotably couples the upper shock actuation member 20 to a first end of the pushrod member 22. A seventh pivotable coupling 44 is located on a portion on the lower connecting member 18 in between pivotable couplings 34, 36 and pivotably couples a second end of the pushrod member 22 to the lower connecting member 18.

An eighth pivotable coupling 46 pivotably couples a second end of the upper shock actuation member 20 to a first end of the damper member 24. A ninth pivotable coupling 48 pivotably couples a second end on the damper member 24 to a third location on the main frame 12.

Alternatively, the pivotable couplings 26, 32, 34, 36, 40, 42, 44, 46 can be located at different locations on the upper connecting and rear axle floating members 14, 16, lower connecting link member 18, upper shock actuation member 20, and pushrod member 22, e.g., inboard from the ends of these members (not shown). These different locations can be selected by a suspension designer to alter the suspension kinematics and particularly the leverage curve of the rear suspension, as will be discussed further below.

Figure 5A:
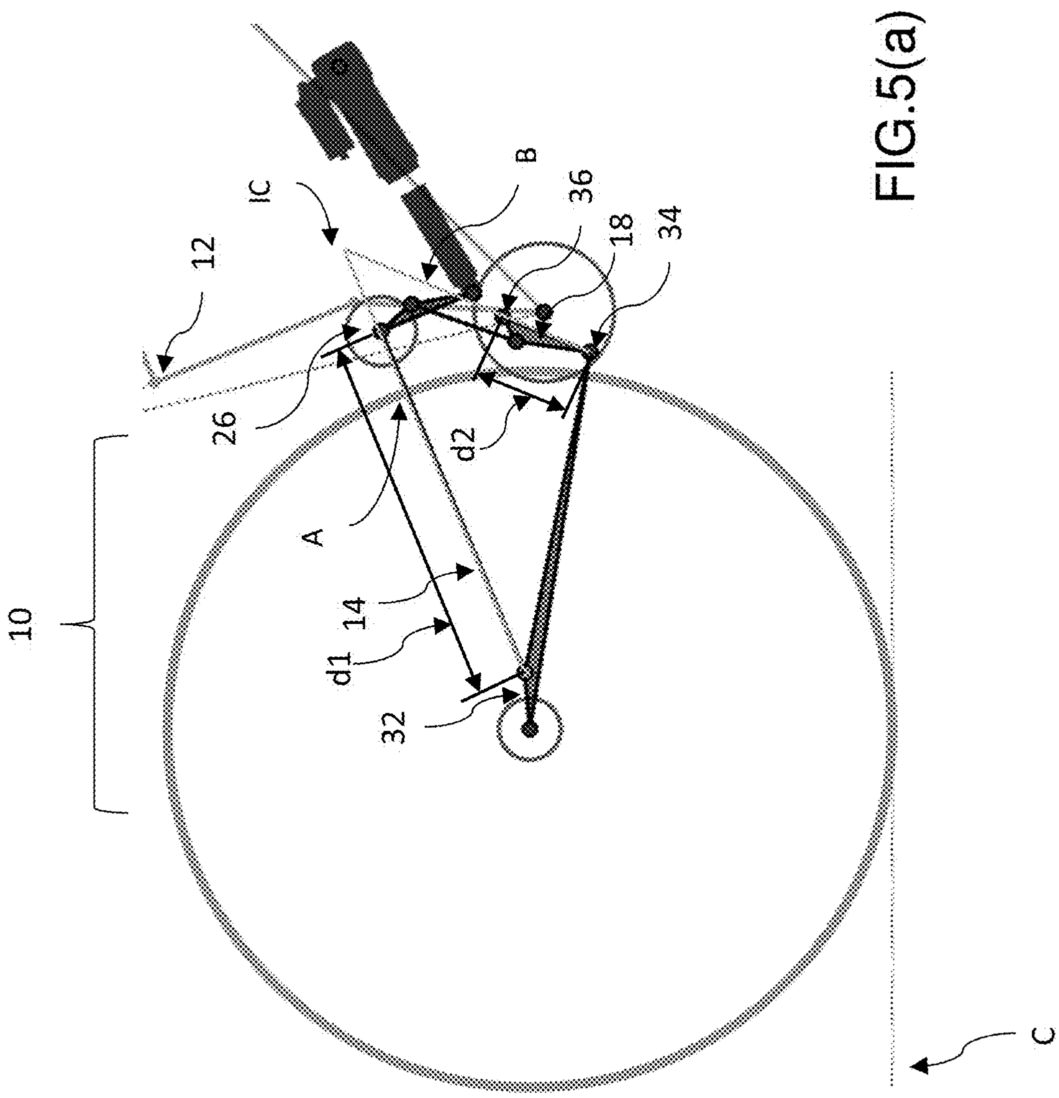
FIGS. 5(*a*) and (*b*) are schematic kinematic views showing the instant centre of the embodiment of the rear suspension shown in FIG. 2 in uncompressed (FIG. 5(*a*)) and compressed (FIG. 5(*b*)) positions.
Figure 5B:
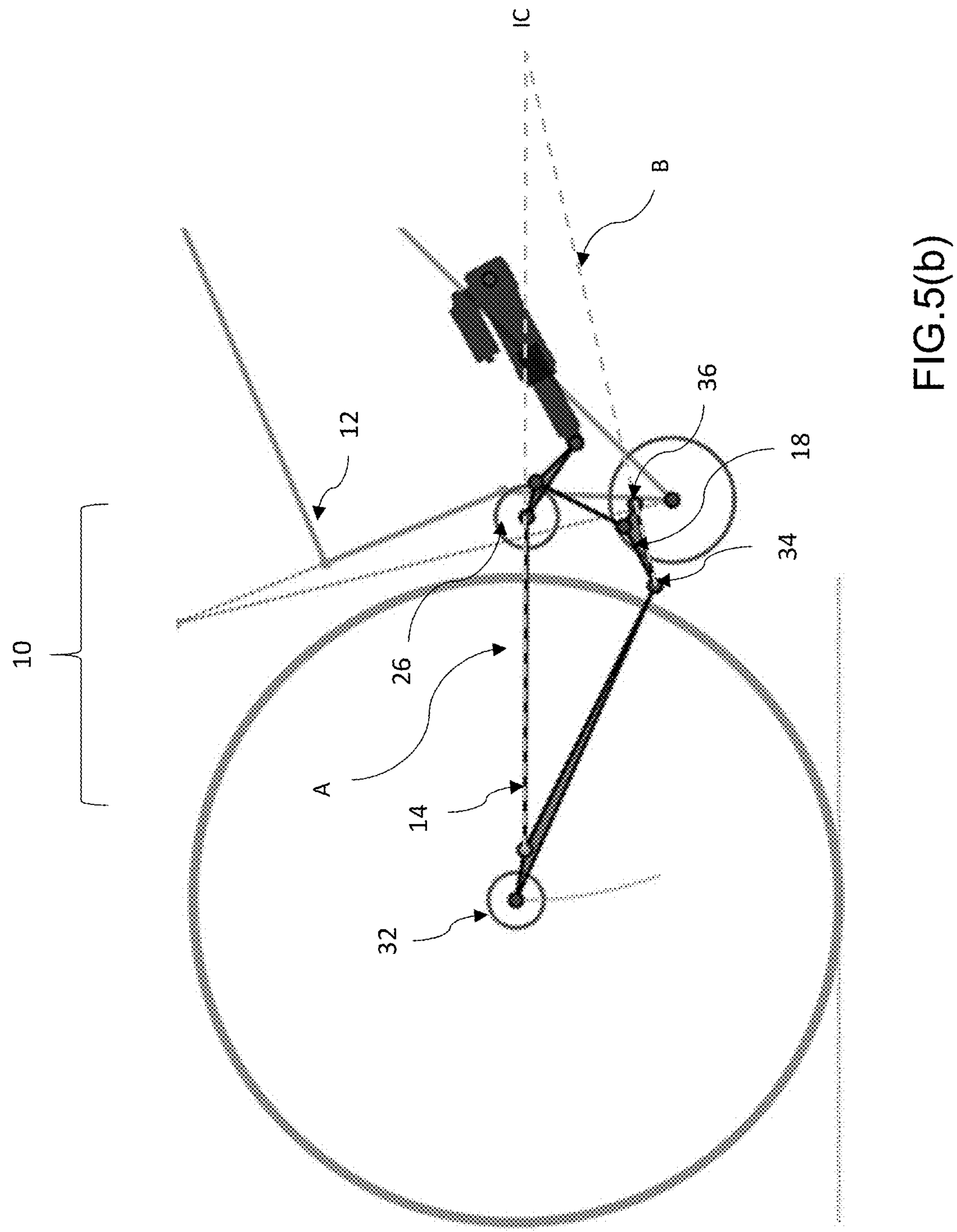

Because the rear axle 30 is mounted to the rear axle floating member 16 in this embodiment, the path the rear axle 30 follows as the suspension 10 is compressed is defined by the instant centre of rotation of the rear axle floating member 16 with respect to the main frame 12. Referring to FIGS. 5(*a*) and (*b*), the instant centre "IC" is defined by the intersection of the lines A, B, that are defined by the locations of pivotable couplings 26, 32 on the upper connecting member 14 and the location of pivotable couplings 34, 36 on the lower connecting member 18.

The pivotable coupling 36 connecting the lower connecting member 18 to the main frame 12 is located lower than the pivotable coupling 26 connecting the upper connecting member 14 to the main frame 12. Additionally, the distance d1 between pivotable couplings 26 and 32 along the upper connecting member 14 is greater than the distance d2 between pivotable couplings 34 and 36 along the lower connecting member 18. The combination of these two characteristics means that the instant centre IC moves forward as the rear suspension 10 is compressed. By arranging pivotable couplings in this way, the instant centre IC is also generally located higher with respect to the ground plane C than the rear axle 28 when the rear suspension 10 is fully extended. The instant centre IC also remains higher than the rear axle 28 for most of the rear suspension travel. The location of pivotable couplings 26, 32, 34, 36 allow for subtle alteration in this instant centre/rear axle height relationship but the general characteristic of a high instant centre that moves forward as the rear suspension 10 is compressed is inherent to this suspension layout.

The height of the instant centre IC relative to the rear axle 28 when measured from the ground plane C is a variable that defines the axle path of the rear suspension 10. Axle path refers to the arc that the axis of the rear axle 28 follows when the rear suspension 10 is compressed. A rearward axle path refers to an axle path characteristic where the rear axle 28 moves rearward as the rear suspension 10 is compressed. This characteristic may be desirable in some instances by allowing the bike 1 and rider to conserve momentum when the rear wheel encounters large obstacles in the trail as a greater proportion of the force acting at the rear wheel is translated into motion of the rear suspension 10 thus reducing the magnitude of force decelerating bike and rider under an impact.

The instant centre IC is a key determinator of the anti-rise characteristics of a suspension layout. Anti-rise is a measure of the influence of braking force applied at the rear contact patch on suspension movement. Referring to FIGS. 6(*a*) and (*b*), the forward direction and magnitude of translation of the instant centre that is inherent to a conventional (prior art) four-bar suspension layout having a lower connecting member that is shorter than an upper connecting member results in a non-linear decrease in anti-rise as the rear suspension is compressed. This anti-rise curve is distinctly different from the more consistent and linear anti-rise characteristics of a Horst-link configuration (having a lower connecting member that is longer than an upper connecting member), where the instant centre follows a rearward path with a lower magnitude of translation. The anti-rise characteristics of a four-bar configuration as shown in FIGS. 6(*a*) and (*b*) are considered desirable as they balance the requirement for high anti-rise around ride height to counter inertial load transfer and preserve bike geometry under braking with the desire to allow the rear suspension to freely extend after deeper compressions of the suspension.

Figure 7:
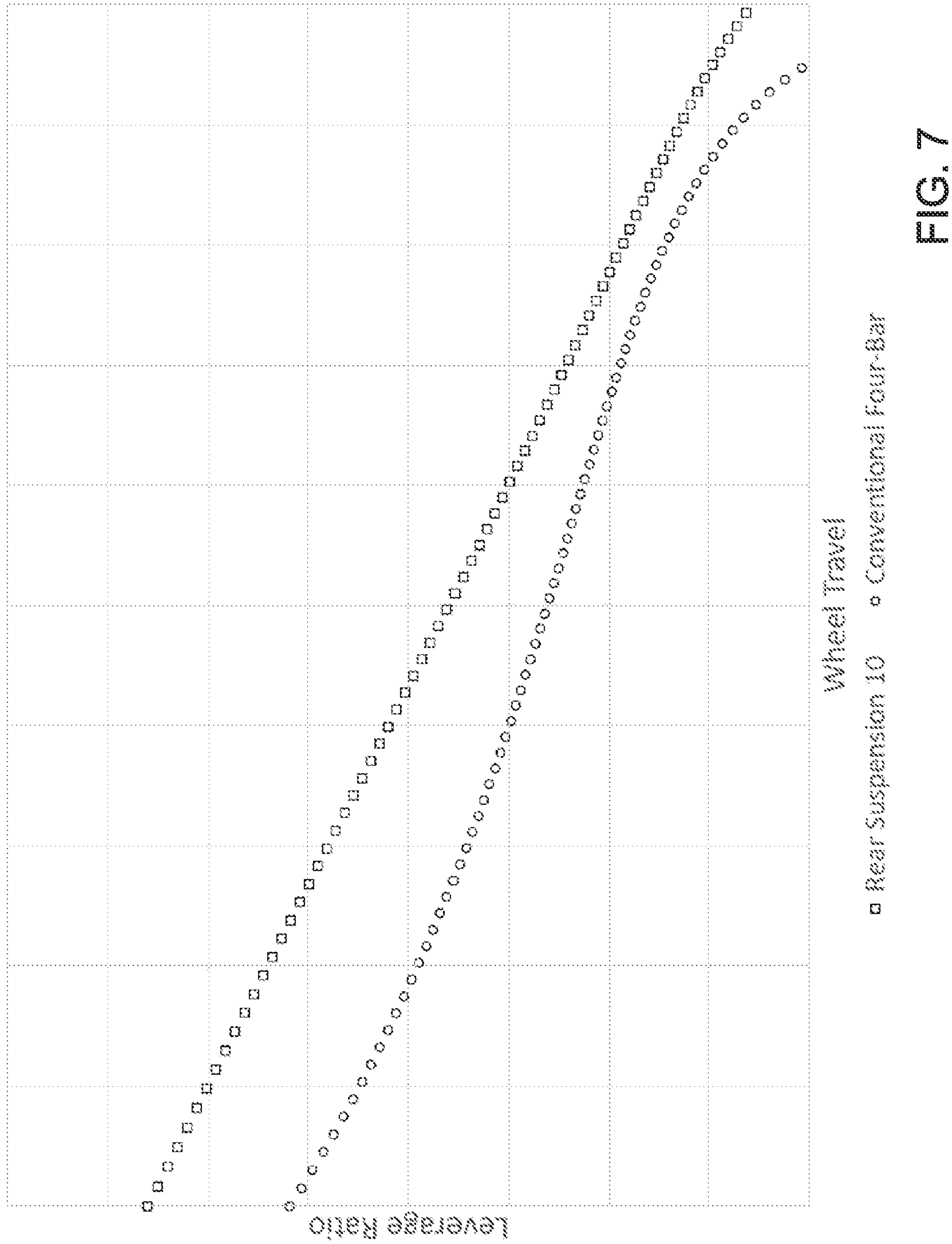
FIG. 7 is a graph of the leverage curves of the prior art rear suspension shown in FIGS. 6(*a*) and (*b*) and the rear suspension embodiment shown in FIG. 2.
Figure 8:
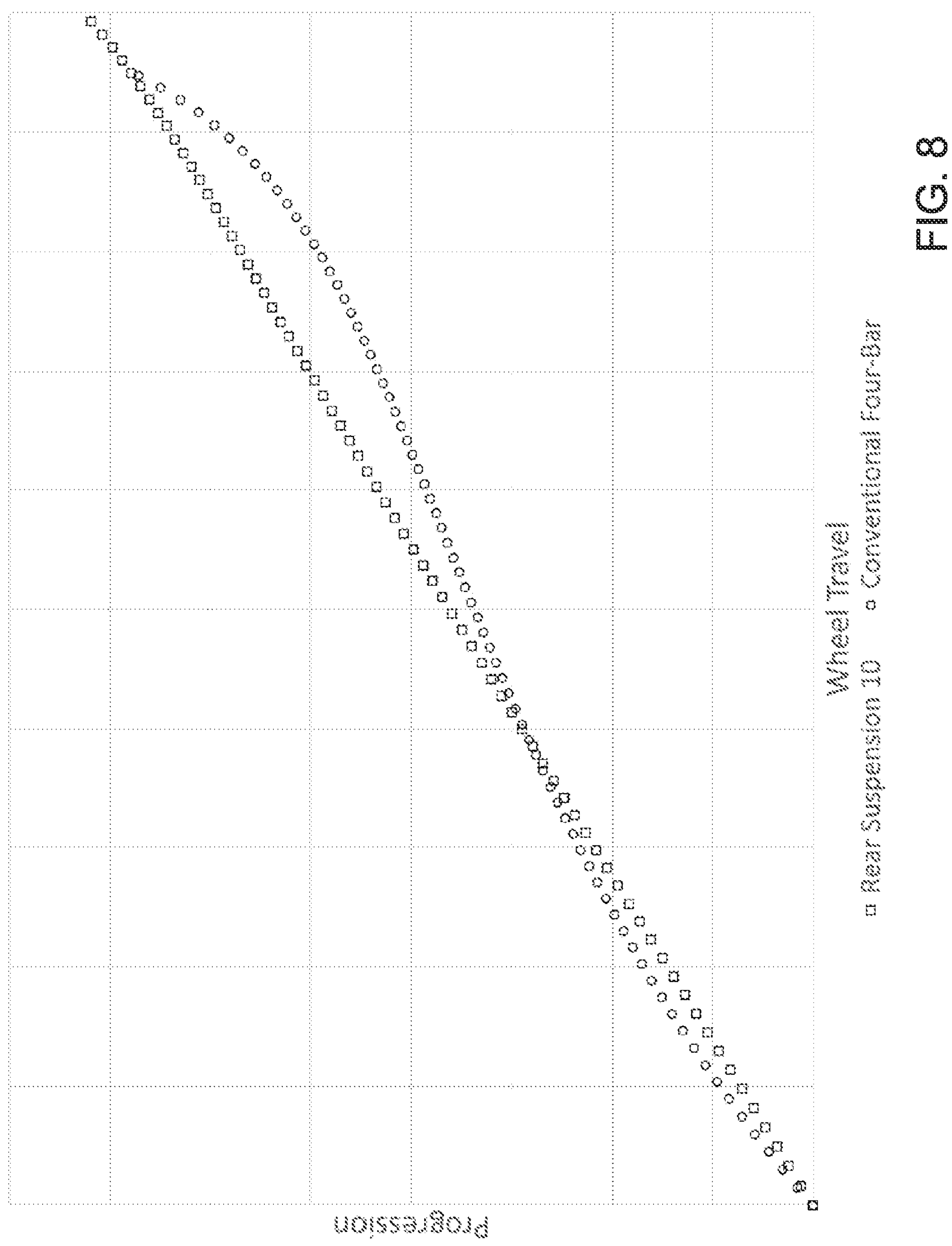
FIG. 8 is a graph of the progression curves of the prior art rear suspension shown in FIGS. 6(*a*) and (*b*) and the rear suspension embodiment shown in FIG. 2.

However, the forward direction and magnitude of translation of the instant centre IC that is inherent to the configuration shown in FIGS. 6(*a*) and (*b*) can result in some undesirable leverage curve characteristics. In particular, the leverage curve progression may not be consistent through the suspension travel and instead can have a non-linear curve as shown in FIGS. 7 & 8 (labelled as "Conventional Four Bar").

In contrast, the rear suspension 10 as shown in FIGS. 1-4 introduces two additional suspension links (the upper shock actuation member 20 and the pushrod member 22) to actuate the damper member 24, allowing the leverage curve characteristics to be altered independently of anti-rise. By selecting the locations of the pivotable connections of the upper shock actuation member 20 and pushrod member 22, the forward translation of the instant centre can be adjusted. In the embodiment shown in FIGS. 1-4, the geometries of the upper shock actuation member 20 and pushrod member 22 are selected to generate a more linear leverage curve with consistent progression shown in FIGS. 7 & 8 while maintaining the desired non-linear anti-rise traits of a conventional four bar suspension layout as shown in FIGS. 6(*a*) and (*b*).

ALTERNATE EMBODIMENTS

Figure 9:
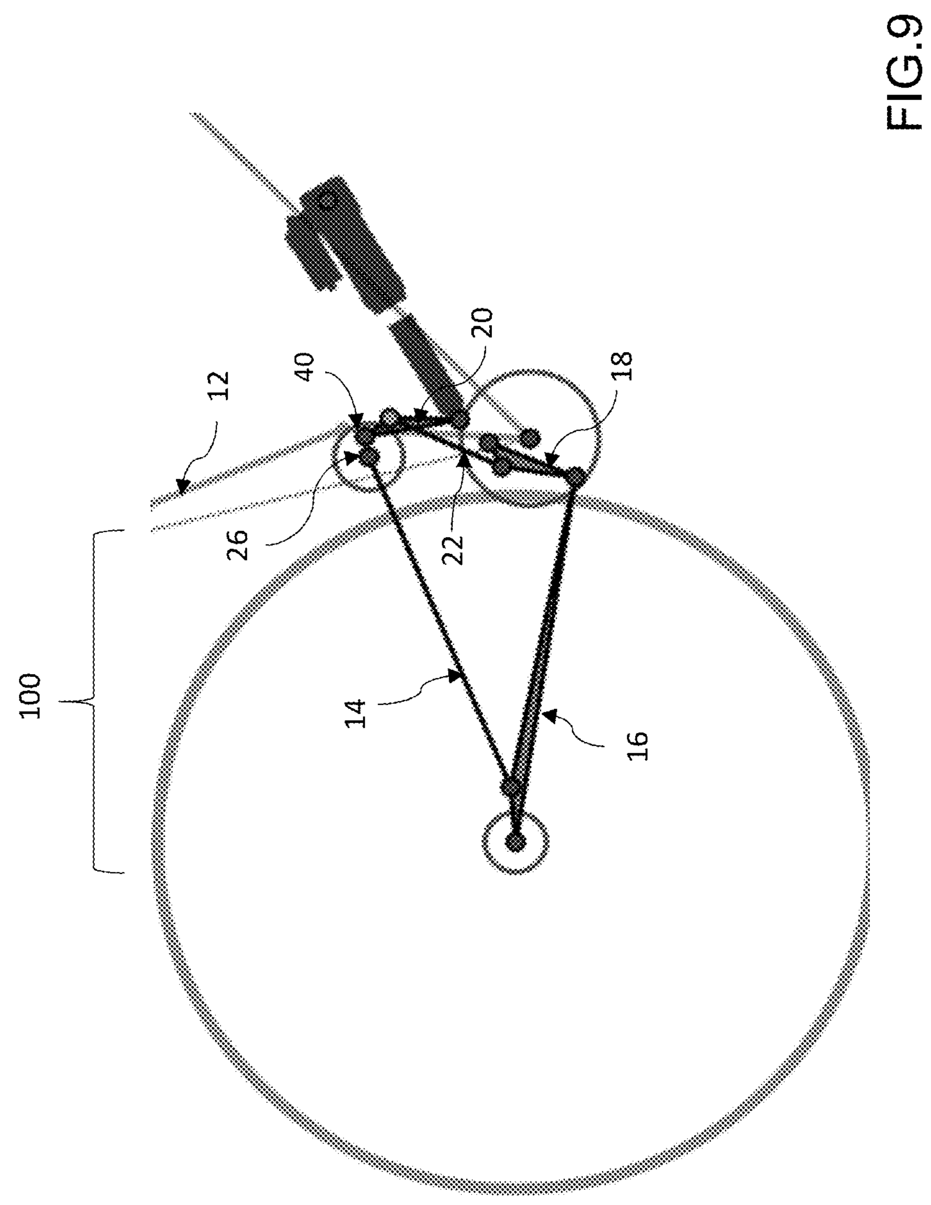
FIG. 9 is a schematic kinematic view of a first alternative embodiment of the rear suspension.

Referring to FIG. 9, a first alternate embodiment of the rear suspension 100 is a variation of the primary embodiment 10, wherein the pivotable couplings 26, 40 to the main frame 12 of the upper shock actuation member 20 and the upper connecting member 14 (circled) are not concentric with each other. This variation may be desirable for packaging of the suspension members 14, 16, 18, 20, 22 and/or to achieve desired leverage curve characteristics.

Figure 10:
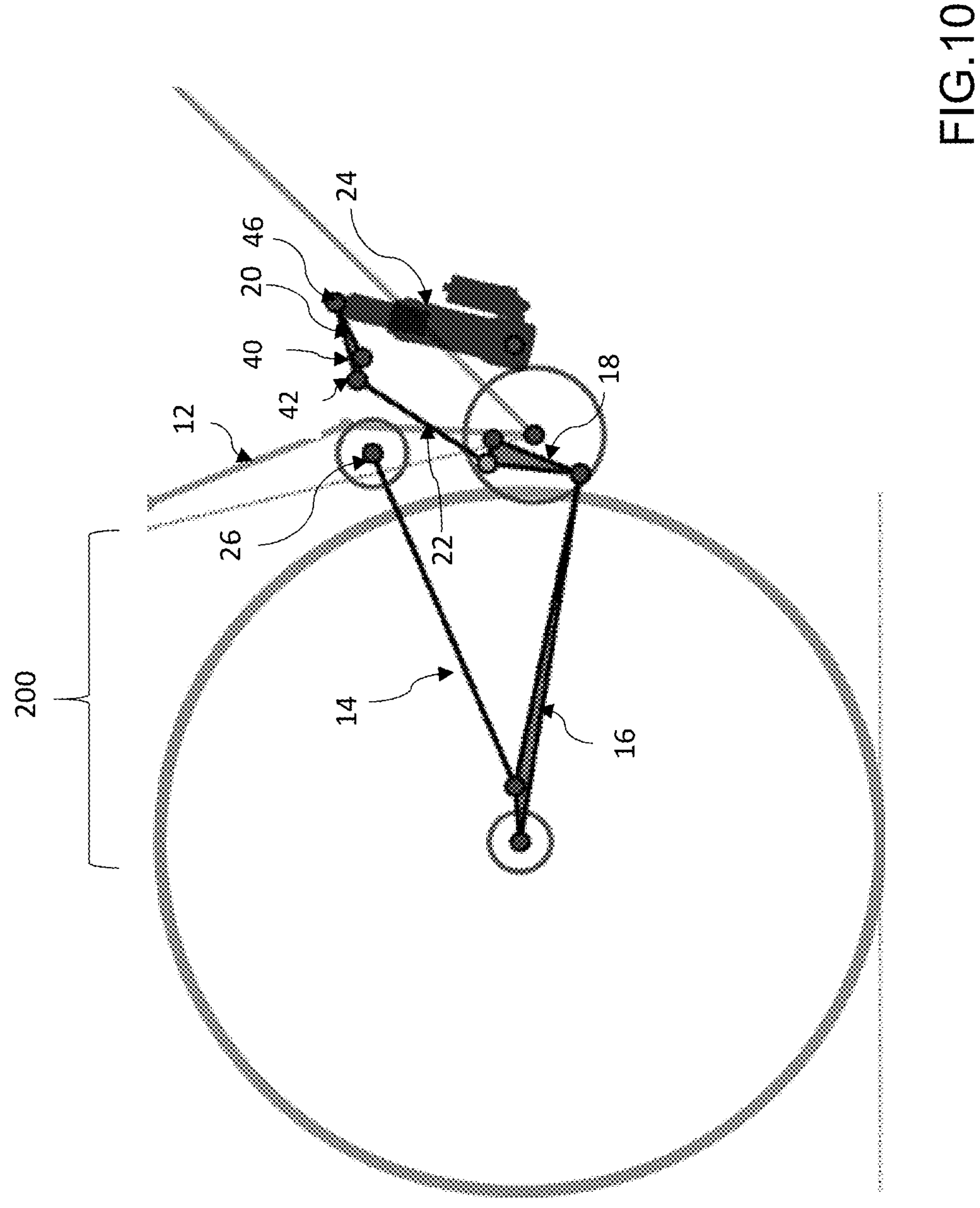
FIG. 10 is a schematic kinematic view of a second alternative embodiment of the rear suspension.

Referring to FIG. 10, a second alternate embodiment of the rear suspension 200 is a further variation of the primary embodiment 10, wherein the pivotable couplings 26, 40 to the main frame 12 of the upper shock actuation member 20 and the upper connecting member 14 (circled) are not concentric with each other. Additionally, the pivotable coupling 40 that couples the upper shock actuation member 20 to the main frame 12 is located between the pivotable coupling 42 that couples the pushrod member 22 and upper shock actuation member 20 and the pivotable coupling 46 that couples the damper member 24 to the upper shock actuation member 20, thereby resulting in a "rocker" style upper shock actuation member 20. This alternate embodiment may be desirable for packaging of the suspension members 14, 16, 18, 20, 22 and/or to alter the direction and location of forces through suspension components.

The terminology used herein is for the purpose of describing particular embodiments only and is not intended to be limiting. Accordingly, as used herein, the singular forms "a", "an" and "the" are intended to include the plural forms as well, unless the context clearly indicates otherwise. It will be further understood that the terms "comprises" and "comprising," when used in this specification, specify the presence of one or more stated features, integers, steps, operations, elements, and components, but do not preclude the presence or addition of one or more other features, integers, steps, operations, elements, components, and groups. Directional terms such as "top", "bottom", "upwards", "downwards", "vertically", and "laterally" are used in the following description for the purpose of providing relative reference only, and are not intended to suggest any limitations on how any article is to be positioned during use, or to be mounted in an assembly or relative to an environment.

Additionally, the term "couple" and variants of it such as "coupled", "couples", and "coupling" as used in this description are intended to include indirect and direct connections unless otherwise indicated. For example, if a first device is coupled to a second device, that coupling may be through a direct connection or through an indirect connection via other devices and connections. Similarly, if the first device is communicatively coupled to the second device, communication may be through a direct connection or through an indirect connection via other devices and connections.

As used herein, a reference to "about" or "approximately" a number or to being "substantially" equal to a number means being within +/−10% of that number.

It is contemplated that any part of any aspect or embodiment discussed in this specification can be implemented or combined with any part of any other aspect or embodiment discussed in this specification.

The scope of the claims should not be limited by the preferred embodiments set forth in the examples, but should be given the broadest interpretation consistent with the description as a whole.

What is claimed is:

1. A rear suspension for a two-wheeled vehicle, comprising:

an upper connecting member having a first pivotable coupling for pivotably coupling a first location on the upper connecting member to a first location on a main frame of the two-wheeled vehicle;

a rear axle floating member having a rear axle and a second pivotable coupling pivotably coupling a second location on the upper connecting member to a first location on the rear axle floating member;

a lower connecting member having a third pivotable coupling pivotably coupling a second location on the rear axle floating member to a first location on the lower connecting member, and a fourth pivotable coupling for pivotably coupling a second location on the lower connecting member to a second location on the main frame;

an upper shock actuation member having a fifth pivotable coupling for pivotably coupling a first location on the upper shock actuation member to a third location of the main frame;

a pushrod member having a sixth pivotable coupling pivotably coupling a second location on the upper shock actuation member to a first location on the pushrod member, and a seventh pivotable coupling pivotably coupling a second location on the pushrod member to a third location on the lower connecting member; and a damper member having an eighth pivotable coupling pivotably coupling a third location of the upper shock actuation member to a first location of the damper member, and a ninth pivotable coupling for pivotably coupling a second location on the damper member to a fourth location on the main frame;

wherein a distance between the first and second pivotable couplings along the upper connecting member is longer than a distance between the third and fourth pivotable couplings along the lower connecting member.

2. The rear suspension as claimed in claim 1, wherein the first pivotable coupling and the fifth pivotable coupling are concentric.

3. The rear suspension as claimed in claim 1, wherein the first pivotable coupling and the fifth pivotable coupling are non-concentric.

4. The rear suspension as claimed in claim 3, wherein the sixth pivotable coupling is located between the fifth pivotable coupling and the eighth pivotable coupling.

5. The rear suspension as claimed in claim 3, wherein the fifth pivotable coupling is located between the sixth pivotable coupling and the eighth pivotable coupling.

* * * * *